Patented Apr. 15, 1952

2,593,098

UNITED STATES PATENT OFFICE 2,593,098

ORGANIC PEROXIDES AS PROMOTERS FOR SILVER OXIDATION CATALYSTS AND PROCESS USING THE SAME

William E. Burt, Pleasant Ridge, Mich., assignor to Ethyl Corporation, New York, N. Y., a corporation of Delaware No Drawing. Application December 9, 1950, Serial No. 200,109

4 Claims. (Cl. 260—348.5)

This invention relates to a promoter for a catalyst useful in the oxidation of olefins. In particular my invention relates to a promoter for a catalyst for the oxidation of ethylene to ethylene oxide. My invention is also directed to a process for the oxidation of ethylene using silver deposited on a support and promoted by an organic peroxide.

Ethylene oxide is an important chemical intermediate, being employed commercially in many processes. For example, acrylonitrile can be manufactured by treating ethylene oxide with hydrogen cyanide. Hydrolysis of ethylene oxide to ethylene glycol results in an important anti-freeze compound. Likewise, from ethylene glycol can be prepared dinitro glycol for dynamite. Furthermore, ethanolamines, resins, polymers, aldehydes and glycol ethers can be manufactured from ethylene oxide. By treating the oxide with alkyl phenols important detergents can be manufactured, etc. Finally ethylene oxide finds commercial use itself as a solvent and fumigant.

It is well known that silver catalyzes the oxidation of ethylene, by means of air or oxygen, to ethylene oxide. Of the many catalysts proposed for this reaction, only silver has been proved in practice to possess sufficient activity and selectivity to merit consideration in a commercial operation. However, for successful commercial operation such catalyst must remain active over long periods of use, must be insensitive to changes of temperature, and must be relatively insensitive to impurities present in the reactants. Silver metal, used alone, fails to satisfy these requirements. In addition, the conversion of ethylene to ethylene oxide must be high and the formation of by-products, or products of competing reactions must be minimized in order that the manufacturing process be economically attractive. Silver alone produces extremely small yields of ethylene oxide and uneconomically high yields of acetaldehyde, carbon dioxide and water.

Various means have been proposed to overcome these disadvantages, such as incorporating an inert material with the silver, with limited success. Most of these expedients produce a catalyst which suffers from one or more of the disadvantages inherent in the silver alone. In addition, control of the reaction, because of poor heat transfer of the supported catalyst makes the reaction temperature more difficult to control, resulting in an increased proportion of undesirable products, or requiring complicated reactors with internal cooling facilities.

It is, accordingly, an object of my invention to provide a promoter for silver such that ethylene oxide can be produced by the direct oxidation of ethylene in its presence in improved yield. An additional object of this invention is to provide a silver catalyst promoter which retains maximum activity over long periods, to produce a high yield of ethylene oxide over a broad range of temperatures, and is not destroyed by accidental exposure to abnormally high temperature. It is a further object of my invention to provide a catalyst promoter for the manufacture of ethylene oxide whereby the activity of the catalyst reaches a maximum after a short period of operation. As a still further object I have provided means for preparing a supported silver catalyst and promoter which can be utilized in a process employing fluidized technique to obtain proper control of the exothermic reaction, and minimize the side and secondary reactions. Other objects of my invention will appear from the further description hereinafter.

I obtain the advantages of my invention by incorporating silver, and an organic peroxide promoter on a refractory supporting material. Any of the well known silver catalyst supports such as corundum, pumice, charcoal, activated carbon, silic gel, silicon carbide and Alundum can be used. In addition supports known to me but not published which can be used are $MgO.BaO$, $ZrO_2.SiO_2$, $MgO.Al_2O_3$, $BeO$ and $Fe_3O_4$.

I have found that organic peroxides are exceptionally good promoters and result in a stable catalyst unaffected by sudden temperature increases. Among the peroxides that can be used are benzoyl peroxide, acetyl peroxide, urea peroxide, cumene hydroperoxide, ditertiarybutyl peroxide and lauroyl peroxide. The conventional amount of silver is deposited on my support, namely 4 to 50 per cent with the best results being obtained between 4 and 20 per cent. The amount of promoter used is generally small and varies between 0.5 per cent and 4.0 per cent.

The temperature of reaction for my process is between 150° and 400° C. although the normal preferred range is between 250° and 300° C. An important advantage of my promoters is that they stand up well as temperatures above 300° C. Frequently due to poisoning, the silver catalyst loses its activity but the activity can be restored when the temperature is increased above 300° C. Also misoperation may result in a high temperature which must be withstood by the support.

It is also important that the catalytic activity of the catalyst reach a maximum after a short period of operation, in order to increase its usefulness. Our promoter is excellent in this respect.

The support, catalyst, and promoter may be prepared and used in any suitable manner as that generally described in the article by McBee, Hass, and Wiseman, Industrial and Engineering Chemistry, 37, 432 (1945). However since I prefer to use my catalyst in a fluidized operation I will describe the procedure best suited for such operation. However, it is to be understood that my invention is not limited to a fluidized operation.

The support material to be used is first mixed in the proper proportion and then sized by screening with standard screens of 100-, 200-, and 325-mesh. The different particle sizes falling within the above mesh sizes are then mixed with silver oxide and one of my promoters and distilled water, thereby forming a slurry. The promoter in the proper amount is also added at this point. The slurry is heated while agitating to a temperature of about 120° C. until the catalyst is thoroughly dried. After such drying, each size of catalyst is rescreened and the desired portions of each size are mixed and the catalyst is ready for use in the fluidized reactor.

My invention can be best understood by referring to the following working examples.

A corundum support was crushed, ground and prepared as above. The silver content incorporated therein was 14.6 per cent and 2.0 per cent of benzoyl peroxide was added. The particle size was 35 parts between 100- and 200-mesh, 35 parts between 200- and 325-mesh and 30 parts smaller than 325-mesh. To a reactor suitable for fluidized operation and containing 100 parts of catalyst 10 parts of air to 1 part of ethylene were continuously introduced. The reaction temperature was maintained at 268° C. and the pressure was atmospheric.

The reaction products were continuously separated from the catalyst. At the end of 309 hours of continuous operation the conversion to ethylene oxide was about 30 per cent with 62.8 per cent of the ethylene reacting.

To demonstrate the thermal stability of the promoter the temperature was increased to 310° C. for 24 hours and then decreased to 266° C. The conversion to ethylene oxide after such thermal treatment was about 29 per cent and the amount of ethylene reacted was 62.6 per cent. Thus temperature increases have little effect on my promoters.

Likewise when acetyl peroxide, urea peroxide, cumene hydroperoxide, ditertiarylbutyl peroxide and lauryl peroxide are substituted for benzoyl peroxide, equally good results are obtained.

Within the limits given herein, the use of different supports, different organic peroxide promoters, different particle sizes, and varying temperatures resulted in ethylene oxide yields of between 25 and 40 per cent.

In all of the examples the catalyst reached its maximum activity in a short period of time, usually less than 24 hours, it fluidized readily, good conversions were obtained, and the activity did not decrease with continued use nor with increases in temperature.

However, in another example in which the catalyst was the same as in the first example except that no promoter was used, the yield of ethylene oxide under the same conditions, was less than 20 per cent.

The above examples are merely illustrative of my invention and other modifications will be readily apparent to those skilled in the art.

I claim:

1. An oxidation catalyst consisting essentially of from 4 per cent to 50 per cent silver, a support therefor, and from 0.5 per cent to 4 per cent of an organic peroxide.

2. An oxidation catalyst consisting essentially of from 4 per cent to 50 per cent silver, a support therefor, and from 0.5 per cent to 4 per cent of benzoyl peroxide.

3. A process for producing ethylene oxide comprising reacting ethylene with oxygen in the presence of the catalyst of claim 1, said process conducted at a temperature between 150 and 400° C.

4. A process for producing ethylene oxide comprising reacting ethylene with oxygen in the presence of the catalyst of claim 2, said process conducted at a temperature between 150 and 400° C.

WILLIAM E. BURT.

REFERENCES CITED

The following references are of record in the file of this patent:

UNITED STATES PATENTS

| Number | Name | Date |
|---|---|---|
| 2,194,602 | Law | Mar. 26, 1940 |
| 2,491,057 | Nevison et al. | Dec. 13, 1949 |